United States
Wick et al.

[11] 3,860,950
[45] Jan. 14, 1975

[54] METHOD AND APPARATUS FOR RECORDING AND READING OUT HOLOGRAMS ON BLACK-AND-WHITE FILM

[75] Inventors: Richard Wick, Munich; Friedrich Bestenreiner, Grunwalt, both of Germany

[73] Assignee: Agfa-Gevaert Aktiengesellschaft, Leverkusen, Germany

[22] Filed: Jan. 28, 1972

[21] Appl. No.: 221,672

[30] Foreign Application Priority Data
Jan. 29, 1971 Germany............................ 2104277

[52] U.S. Cl................ 358/2, 350/3.5, 350/162 SF, 358/44
[51] Int. Cl......................... H04m 9/02, G02b 27/00
[58] Field of Search........................ 350/3.5, 162 SF; 178/5.4 ST, 5.4 CD, 6.7 A, 5.2

[56] References Cited
UNITED STATES PATENTS
3,378,633   4/1968   Macovski..................... 350/162 SF
3,610,722   10/1971  Bestenreiner et al............... 350/3.5
3,790,701   2/1974   Istvan................................... 350/3.5

OTHER PUBLICATIONS
'Pressing' Pictures on Holographic Tape..., Electronics, Nov. 10, 1969, pp. 108–114.

*Primary Examiner*—Ronald J. Stern
*Attorney, Agent, or Firm*—Michael S. Striker

[57] ABSTRACT

Holograms of frames of motion picture color film are exposed on black-and-white film which is thereupon developed and bleached (if necessary) prior to introduction into a reading apparatus. The recording apparatus employs a single laser or a set of discrete lasers for the production of a coherent light beam having three different wavelengths, a grating having two linear color grating components extending across the path of the coherent beam, a transporting mechanism for placing discrete frames of an original color film into register with the grating so that the grating and the frame in register therewith modulate the beam, and means for utilizing the modulated beam for exposing holograms (preferably sets of three superimposed holograms) on black-and-white film.

17 Claims, 3 Drawing Figures

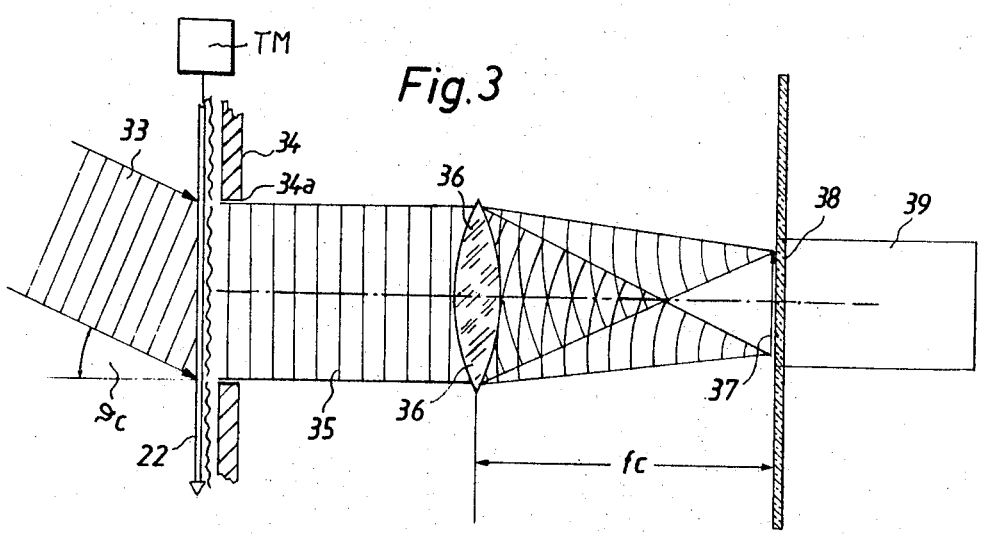

METHOD AND APPARATUS FOR RECORDING AND READING OUT HOLOGRAMS ON BLACK-AND-WHITE FILM

BACKGROUND OF THE INVENTION

The present invention relates to a method and apparatus for recording and reading out or reproducing holograms on a photosensitive carrier medium. More particularly, the invention relates to a method and apparatus for recording a series of holograms on a photographic film, especially for recording holograms of successive frames of original motion picture color films, such as 8-millimeter color films. Still more particularly, the invention relates to a method and apparatus for recording holograms on black-and-white film and for reading out the holograms for the purpose of reconstructing the images of the frames of original film.

It is already known to illuminate an original color image and to break the image into its luminance and chrominance components. The separately determined discrete color signals are recorded on an auxiliary carrier on black-and-white film by means of an electron beam. The film is thereby provided with a black-and-white image and the color information is stored in the form of two sets of vertical strips. The black-and-white image is recorded in a conventional manner and the resulting hologram is developed in such a way that it is provided with a relief pattern which can be treated galvanically and reproduced by stamping on thermoplastic material at a relatively low cost. The just described method of producing holograms is satisfactory when it is necessary to produce a large number of holograms. This is due to the fact that the reproduction of an original hologram or master in large numbers can be carried out at a reasonable cost. However, the making of the master is a very complex operation so that the just described method is less satisfactory for the manufacture of limited numbers or small runs of holograms. The aforedescribed method is especially impractical for the copying of motion picture color films which were exposed in the conventional manner and are to be transformed in such a way that the thus stored information can be reproduced by apparatus which have been recently developed for use in connection with hologram films.

SUMMARY OF THE INVENTION

An object of the invention is to provide a novel and improved method of recording on a photosensitive carrier medium a series of holograms which can represent the images of frames on original films, such as films exposed in still cameras but preferably motion picture color films, especially 8-millimeter color films.

Another object of the invention is to provide a method of making hologram films from original films at a cost which is but a fraction of the cost of making hologram films in accordance with heretofore known procedures and which can be resorted to with particular advantage for the production of small numbers of holograms.

A further object of the invention is to provide a novel and improved apparatus for recording holograms on a photosensitive record medium and for reading the thus obtained holograms.

An additional object of the invention is to provide the apparatus with novel and improved means for recording holograms of frames of color film on conventional black-and-white film.

The method of the present invention is utilized for the making on photosensitive material of a sequence of holograms of frames of original film, particularly 8-millimeter color film. The method comprises the steps of placing discrete frames of an original film into register with a grating having at least one linear color grating component, illuminating the frames which register with the grating by means of a coherent beam of light having a plurality of wavelengths (e.g., red, green and blue), and utilizing the beam which is modulated by the grating and by the respective film frame to expose holograms on black-and-white film.

The method further comprises the step of reconstructing the images represented by the holograms on black-and-white film, including utilizing an electron beam in a TV tube to spot-scan the holograms.

The coherent beam may comprise three different wavelengths and the grating may comprise two grating components having different colors and frequencies. For example, the colors or spatial frequency components of the grating can be yellow and blue-green.

The aforementioned utilizing step may comprise passing differently colored component beams of the modulated beam through discrete transformation lenses whose focal planes coincide with the plane of that frame of the original film which registers with the grating.

The utilizing step preferably further comprises superimposing on black-and-white film a plurality of holograms for each frame of the original film, one for each wavelength of the modulated beam.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic view of a portion of a reading out apparatus for reconstructing the images represented by holograms on the black-and-white record medium.

DESCRIPTION OF THE PREFERRED EMBODIMENTS

Figure 1:
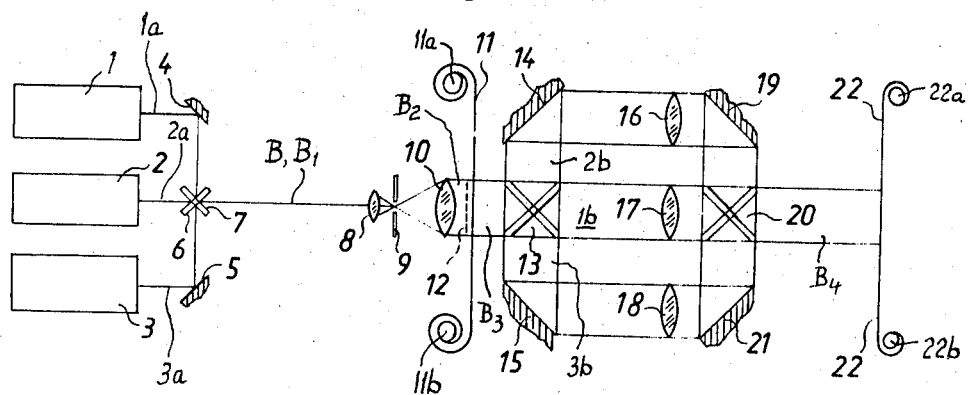
FIG. 1 is a diagrammatic plan view of an apparatus for recording superimposed holograms of color film frames on a black-and-white photosensitive record medium.

Referring first to FIG. 1, there is shown a recording apparatus which comprises three coherent light sources in the form of lasers 1, 2 and 3. The lasers 1, 2, 3 respectively emit beams 1a, 2a, 3a of red, green and blue light. Fixedly mounted mirrors 4, 5 respectively reflect the red and blue light beams 1a, 3a so that the thus reflected beams impinge upon a dichroic beam splitter comprising two color selective mirrors 6, 7. The mirors 6, 7 transmit green light (beam 2a from the laser 2); the mirror 6 transmits red light (beam 1a) but reflects blue light (beam 3a); and the mirror 7 reflects red light (beam 1a) but transmits blue light (beam 3a). The thus obtained consolidated beam B contains light issuing from all three lasers and a portion $B_1$ thereof (see also FIG. 2) is directed against a condensor lens 8 located in front of a mask 9 having a pinhole for the beam $B_1$ which passes through the lens 8. The beam $B_1$ diverges behind the mask 9 and reaches a condensor lens 10. The front focal plane of the lens 10 coincides with the plane of the mask 9; therefore, the beam $B_2$ issuing from the lens 10 is a parallel beam of "clean" light, i.e., it is substantially free of aberrations.

A color filter grating 12 is placed across the parallel beam $B_2$ issuing from the lens 10 and is in surface-to-surface contact with a frame of an exposed and developed original motion picture color film 11. If desired, the grating 12 can be placed immediately behind that portion of the film 11 which extends across the beam $B_2$. The grating 12 contains two different color filter grating components one of which consists of yellow filter strips having a width of 21 microns and alternating with completely transparent strips of the same width. The other grating component consists of blue-green filter strips which alternate with transparent strips, all of these strips having a width of 27 microns. The two grating components are superimposed upon each other and can be obtained photographically by resorting to a multi-layer color film.

The resulting multi-colored parallel beam $B_3$ is modulated by the image on the respective frame of the film 11 and by the grating 12 and is directed against a dichroic beam splitter 13 which reflects a green component beam 2b upwardly against a fixed mirror 14. The blue component beam 3b is reflected onto a fixed mirror 15 and the red component beam 1b is free to pass through the beam splitter 13. Three different transformation lenses 16, 17 and 18 are respectively placed across the component beams 2b, 1b and 3b. The focal lengths of the lenses 16, 17, 18 are selected in such a way that the film 11 is located in their left-hand or front focal planes, as viewed in FIG. 1. Furthermore, the focal length of each of the lenses 16, 17, 18 satisfies the equation $$f_r = \lambda_c/\lambda_r \cdot f_c; \quad f_g = \lambda_c/\lambda_g \cdot f_c; \quad f_b = \lambda_c/\lambda_b \cdot f_c$$

The meaning of symbols used in this equation will be explained with reference to FIG. 3. The symbols $f_g, f_r, f_b$ respectively represent the focal lengths of the lenses 16, 17, 18.

The focal length of each of the lenses 16, 17, 18 is a function of the wavelength ($\lambda_g, \lambda_r, \lambda_b$) of light constituting the respective beam 2b, 1b, 3b. The beams 2b, 1b, 3b which pass through the transformation lenses 16, 17, 18 are condensed into a single beam $B_4$ by two fixed mirrors 19, 21 and a dichroic beam splitter 20, and the beam $B_4$ is caused to impinge on a black-and-white record medium 22.

The optical distance between the lenses 16, 17, 18 and the record medium 22 deviates from the respective focal lengths $f_g, f_r, f_b$ by about 10 percent in order to insure that the dynamics of the record medium 22 are not exceeded due to high concentration of brightness in the focal planes of such lenses.

Figure 2:
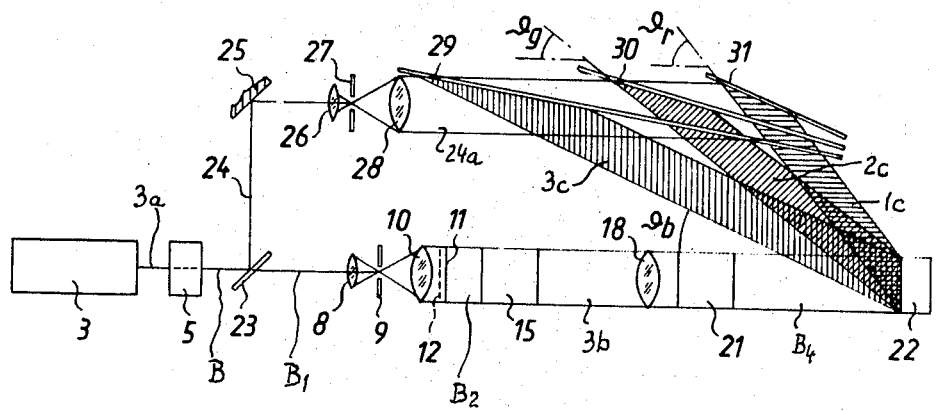
FIG. 2 is a schematic side elevational view of the apparatus of FIG. 1.

FIG. 1 is a diagrammatic plan and FIG. 2 is a diagrammatic side elevational view of the recording apparatus. The latter Figure shows the reference beams. Thus, a partially transmitting mirror 23 (for red, green and blue light) is placed across the beam B between the beam splitter 6, 7 and the condensor lens 8 to transmit the aforementioned beam $B_1$ and to direct a reference beam 24 against a stationary mirror 25. The mirror 25 directs the reference beam 24 against a group 26, 27, 28 of optical elements which are respectively identical with the optical elements 8, 9, 10 of FIG. 1 and perform the same functions. Thus, the beam 24a issuing from the lens 28 is a parallel beam and is directed against a series of partially transmitting mirrors 29, 30, 31 (preferably interference mirrors). The mirrors 29, 30, 31 reflect component reference beams 3c, 2c, 1c in the respective color (blue, green and red) at different angles ($\theta_b, \theta_g \theta_r$) and such light is caused to impinge on that portion of the record medium 22 which is exposed to the beam $B_4$.

The angles $\theta$ can be calculated on the basis of the following equation:

$$\theta_r = \arctan \lambda_r/\lambda_c \cdot \tan \theta_c$$

$$\theta_g = \arctan \lambda_g/\lambda_c \cdot \tan \theta_c$$

$\theta_b = \arctan \lambda_b/\lambda_c \cdot \tan \theta_c$ *wherein* $\lambda_r, \lambda_g, \lambda_b$ are the wavelengths of the respective component reference beams 1c, 2c, 3c (red, green or blue), $\lambda_c$ is the wavelength of the readout beam, and $\theta_c$ is the angle of incidence of the readout beam.

The operation of the recording apparatus of FIGS. 1 and 2 is as follows:

The beam $B_1$ which is composed of portions of the three laser beams 1a, 2a, 3a is modulated by the grating 12 in such a way that, when the resulting reconstructed image is scanned by a flying spot scanner in a TV tube — line-by-line — in a direction at right angles to the longitudinal direction of the film 11 and at right angles to the strips of the grating components of the grating 12, the thus determined intensity value is modulated onto an auxiliary carrier determined by the frequency of the grating 12. Since the constants of the grating 12 are different for each of the three colors, the auxiliary carriers can be distinguished from each other by known electronic means. Thus, the wavefront issuing from the film 11 can furnish information pertaining to the three colors without considering the wavelength of the beam. However, the respective wavelengths must be considered in the making of holograms, especially in the dimensioning of lenses 16, 17, 18 which serve to transform the hologram into infinity. This is necessary in order to obtain a fixed reconstructed image even in the event of continuous relative movement between the hologram film (record carrier 22) and the reproducing apparatus. By considering the aforedescribed conditions for the focal lengths of the lenses 16, 17, 18 and the angles of incidence of the reference beams, it is possible to superimpose on the record medium 22 (which may be a conventional panchromatic black-and-white film) three holograms whereby one of the holograms represents the red image which is modulated by the first grating component of the grating 12, another hologram represents the unmodulated green images and the third hologram represents the blue image which is modulated by the second grating component of the grating 12.

It is clear that the recording apparatus of FIGS. 1 and 2 comprises suitable mechanisms (see the reels 11a, 11b and 22a, 22b) for stepwise transport of the films 11 and 22. The films are exposed to light during the periods of dwell between successive stepwise advances.

Each hologram field on the record medium 22 represents the contents of a frame on the film 11. The fully exposed record medium is then transported through a developer and can be used as an absorption hologram or it can be subjected to a further treatment (such as bleaching or an analogous procedure) to form a phase hologram.

A reproducing apparatus for holograms on the record medium 22 is illustrated in FIG. 3. A laser (not shown) and an optical group (corresponding to the elements 8, 9 and 10 shown in FIG. 1) are employed to produce a parallel readout beam 33 having a wavelength $\lambda_c$ and impinging on the record medium 22 at an angle $\theta_c$. The record medium 22 is assumed to be provided with a series of holograms (each consisting of three superimposed holograms) which represent the information stored in successive frames of the film 11.

A window or aperture 34a in a diaphragm 34 is dimensioned in such a way that its size corresponds to the dimensions of a discrete hologram on the record medium 22. A suitable transporting mechanism TM moves the record medium 22 past the aperture 34a at a constant speed corresponding to the frequency at which the frames of the film 11 were exposed to light during picture taking.

The parallel beam 35 which is refracted by the hologram in registry with the aperture 34a is caused to pass through a retransformation lens 36. The beam 35 is preferably short in order to insure a satisfactory light output. The focal length $f_c$ of the retransformation lens 36 is a function of factors which must be considered during the making of holograms on the record medium 22 (see the aforementioned equation which is resorted to for calculating the focal lengths of lenses 16–18 shown in FIG. 1). The reconstructed image 37 appears behind the lens 36 at the distance $f_c$ and is projected onto a photocathode 38 forming part of a black-and-white television tube 39.

By scanning the reconstructed image 37 with an electronbeam inside television tube 39, one can produce a composite signal which contains a luminance signal as well as chrominance signals. With the help of conventional electronic means, the composite signal from the scanner can be converted into a color image on the screen of a color television receiver. The lens 36 insures that the continuous movement of record medium 22 with reference to the aperture 34a does not influence the stability of images on the photocathode 38.

An important advantage of our method and apparatus is that one can dispense with the expensive and complicated step of recording information on a black-and-white film which is modulated with the color code by means of an electron beam. The record medium 22 which is provided with the black-and-white holograms can be immediately introduced into a developer and bleached (if necessary) prior to introduction into a reading or reconstructing apparatus.

The improved recording and reproducing apparatus can be modified in a number of ways without departing from the spirit of the invention. For example, the lasers 1–3 of FIG. 1 can be replaced with a single laser which emits light in the desired wavelength ranges. It is also possible to use the apparatus for recordal and reproduction of holograms of two-color images on motion picture film or for recordal and reconstruction of images which are exposed by a still camera on a web of roll film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by letters Patent is set forth in the appended claims:

1. A method of producing of sequence of holograms of original film frames on photosensitive material comprising the step of placing discrete frames of original material comprising a color film in which a plurality of colors are superimposed in each of said frames into register with at least one linear color grating, directing a first portion of a first beam of coherent light having a plurality of wavelengths against said discrete frame, modulating said first portion of said first beam by said grating and said frames, thereby producing a second beam, and utilizing said modulated second beam in conjunction with a second portion of said first beam to form a hologram on a photosensitive material.

2. A method as defined in claim 1, wherein said coherent first beam has three different wavelengths and said grating comprises two components of different spatial frequencies and colors.

3. A method as defined in claim 2, wherein the colors of said components are yellow and blue-green.

4. A method as defined in claim 1, wherein said utilizing step comprises passing differently colored component beams of said modulated second beam through discrete transformation lenses whose focal planes coincide with the plane of that frame of the original film which is in register with the grating.

5. A method as defined in claim 1, wherein said utilizing step comprises superimposing on black-and-white film a plurality of holograms for each of said frames, one for each wavelength of said first beam.

6. A method as defined in claim 1, wherein the utilizing step comprises forming a hologram on black-and-white film.

7. A method as defined in claim 1, further comprising the step of reconstructing the images of said discrete frames from said holograms.

8. A method as defined in claim 7, further comprising the step of utilizing a television tube with an electron beam to scan said reconstructed image along lines extending substantially at right angles to the lines of said linear color grating.

9. In an apparatus for producing a sequence of holograms of original film frames on photosensitive material, a combination comprising means for producing a first beam of coherent light having a plurality of wavelengths; a grating having at least one color grating component extending across the path of a first portion of said first beam; means for placing discrete frames of an original color film in which a plurality of colors are superimposed in each of said frames into register with said grating so that said grating and the film frame in register therewith modulate said first portion of said first beam to produce a second beam; and means for utilizing said modulated second beam in conjunction with a second portion of said first beam to form a hologram on a photosensitive material.

10. A combination as defined in claim 9, wherein the means for producing said first beam comprises three discrete lasers each arranged to produce a beam of a different color, and means for superimposing said discrete beams upon each other to thus produce said first beam.

11. A combination as defined in claim 9, wherein said utilizing means comprises means for splitting said modulated second beam into discrete component beams of different wavelengths, a plurality of lenses each located in the path of a different discrete component beam and each having a focal plane coinciding with the plane of that film frame which registers with said grating, and means for superimposing said discrete component beams upon each other to form a third beam which impinges upon black-and-white film.

12. A combination as defined in claim 11, wherein said splitting means comprises a dichroic beam splitter and the focal lengths of said lenses satisfy the equation $$f_r = \lambda_c/\lambda_r \cdot f_c; \quad f_g = \lambda_c/\lambda_g \cdot f_c; \quad f_b = \lambda_c/\lambda_b \cdot f_c$$

wherein $\lambda_c$ is the wavelength of the readout beam, $f_c$ is the focal length of the reconstruction lens, and $\lambda_r$, $\lambda_g$, and $\lambda_b$ are the wavelengths of the respective discrete component beams.

13. A combination as defined in claim 9, wherein said utilizing means comprises means for splitting said modulated second beam into discrete component beams of different wavelengths, a plurality of lenses each located in the path of a different discrete component beam and each having a first focal plane coinciding with the plane of that film frame which registers with said grating, and a second focal plane which is parallel to, but deviates slightly, from the plane of said photosensitive material.

14. A combination as defined in claim 13, wherein the deviation in distance between the second focal plane and the plane of said photosensitive material is about 10 percent of the respective focal length.

15. A combination as defined in claim 9, further comprising means for subdividing said first beam into said first portion and said second portion, and color selective optical elements located in the path of said second portion and each arranged to reflect a differently colored component of said second portion onto that section of said photosensitive material which is exposed to the modulated second beam.

16. A combination as defined in claim 15, wherein each of said optical elements is arranged to deflect the respective component of said second portion at a different angle which is a function of the wavelength of the respective component of said second portion.

17. A combination as defined in claim 16, wherein the angles of incidence of said differently colored components of said second portion satisfy the equations $$\theta_r = \arctan \lambda_r/\lambda_c \cdot \tan\theta_c$$

$$\theta_g = \arctan \lambda_g/\lambda_c \cdot \tan \theta_c$$

$$\theta_b = \arctan \lambda_b/\lambda_c \cdot \tan \theta_c$$

wherein $\lambda_c$ is the wavelength and $\theta_c$ is the angle of incidence of the readout beam which is utilized to reconstruct the images of original film from the holograms on black-and-white film.

* * * * *